(12) United States Patent
Lessin et al.

(10) Patent No.: US 9,491,207 B2
(45) Date of Patent: *Nov. 8, 2016

(54) PROMPTING SOCIAL NETWORKING SYSTEM USERS TO PROVIDE ADDITIONAL USER PROFILE INFORMATION

(71) Applicant: Facebook, Inc., Menlo Park, CA (US)

(72) Inventors: Samuel Lessin, Palo Alto, CA (US); Robert Taaffe Lindsay, San Francisco, CA (US); Justin Alexander Shaffer, Menlo Park, CA (US); Nicholas Felton, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/837,639

(22) Filed: Aug. 27, 2015

(65) Prior Publication Data

US 2015/0373067 A1    Dec. 24, 2015

Related U.S. Application Data

(63) Continuation of application No. 13/680,048, filed on Nov. 17, 2012, now Pat. No. 9,131,019.

(51) Int. Cl.
| | |
|---|---|
| *H04L 1/00* | (2006.01) |
| *H04L 29/06* | (2006.01) |
| *G06Q 30/02* | (2012.01) |
| *G06Q 50/00* | (2012.01) |
| *H04L 29/08* | (2006.01) |

(52) U.S. Cl.
CPC ......... *H04L 65/403* (2013.01); *G06Q 30/0201* (2013.01); *G06Q 30/0251* (2013.01); *G06Q 50/01* (2013.01); *H04L 67/306* (2013.01)

(58) Field of Classification Search
CPC ............ H04L 65/403; G06Q 30/0201; G06Q 30/0251
USPC .................................................. 709/204–207
See application file for complete search history.

(56) References Cited

U.S. PATENT DOCUMENTS

| | | | | |
|---|---|---|---|---|
| 7,730,017 | B2* | 6/2010 | Nance | ............... G06F 17/30699 |
| 7,756,926 | B2* | 7/2010 | Tseng | .................. G06F 17/3089 |
| | | | | 709/201 |
| 7,945,249 | B2* | 5/2011 | Fanelli | .................. H04L 12/581 |
| | | | | 455/3.03 |
| 8,307,086 | B2* | 11/2012 | Whitnah | ............... G06Q 10/10 |
| | | | | 705/319 |
| 8,666,928 | B2* | 3/2014 | Tunstall-Pedoe | . G06F 17/30654 |
| | | | | 706/45 |
| 2012/0166532 | A1* | 6/2012 | Juan | ....................... G06Q 50/01 |
| | | | | 709/204 |
| 2013/0073632 | A1* | 3/2013 | Fedorov | ............... G06Q 10/101 |
| | | | | 709/205 |

* cited by examiner

*Primary Examiner* — Dady Chery

(74) *Attorney, Agent, or Firm* — Fenwick & West LLP

(57) ABSTRACT

A social networking system presents questions to a user on an interface associated with the social networking system to elicit information about the user that is missing from the user's profile or is otherwise outdated. The questions are selected based on a number of factors, such as the need for or value of the information item, probability of a response, or cost of collecting the information item. In presenting the selected question, the social networking system prompts a user for information about the user in a an interface associated with a page from the social networking system, an application external to the social networking system, or using a push notification or prompt. The questions may be formatted in various ways, such as an explicit question, confirmation, a selection of responses, or social context to encourage the user to respond to the question.

25 Claims, 15 Drawing Sheets

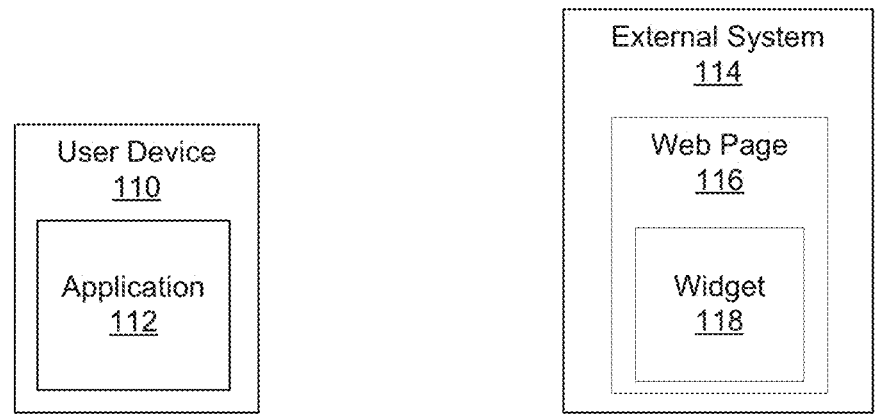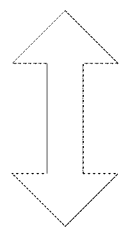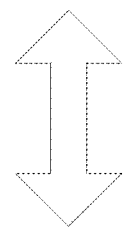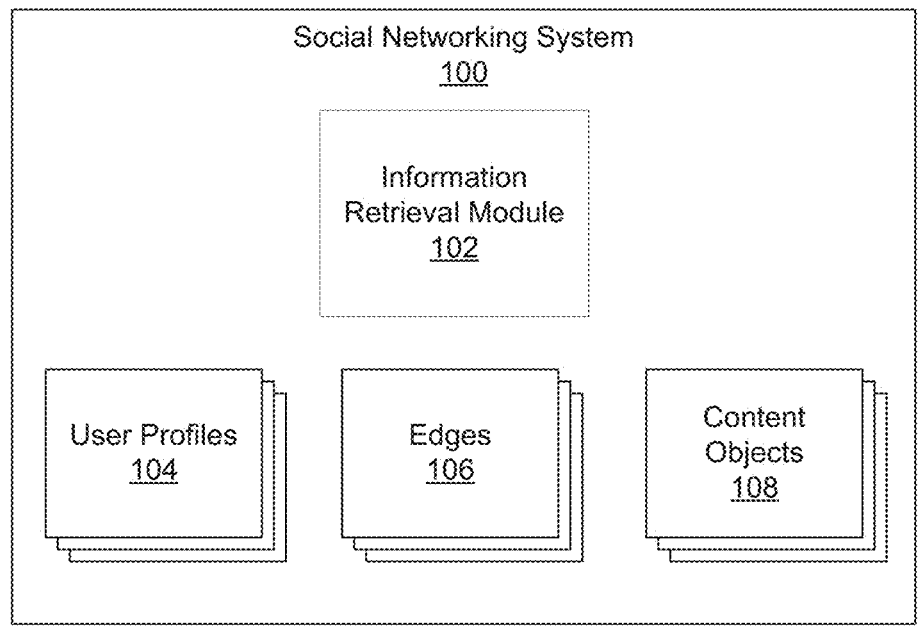
FIG. 1

400

```
┌─────────────────────────────────────────────────────┐
│ Maintain a profile for a user of a social          │──── 402
│ networking system, where the profile has a set of  │
│ information items describing the user              │
└─────────────────────────────────────────────────────┘
                        │
                        ▼
┌─────────────────────────────────────────────────────┐
│ Determine an acquisition value for information     │──── 404
│ items in the set of information items              │
└─────────────────────────────────────────────────────┘
                        │
                        ▼
┌─────────────────────────────────────────────────────┐
│ Selecting an unknown information item based at     │──── 406
│ least in part on the acquisition value             │
└─────────────────────────────────────────────────────┘
                        │
                        ▼
┌─────────────────────────────────────────────────────┐
│ Selecting a question associated with the unknown   │──── 408
│ information for presentation                       │
└─────────────────────────────────────────────────────┘
                        │
                        ▼
┌─────────────────────────────────────────────────────┐
│ Presenting the selected question to the user       │──── 410
└─────────────────────────────────────────────────────┘
```

FIG. 4

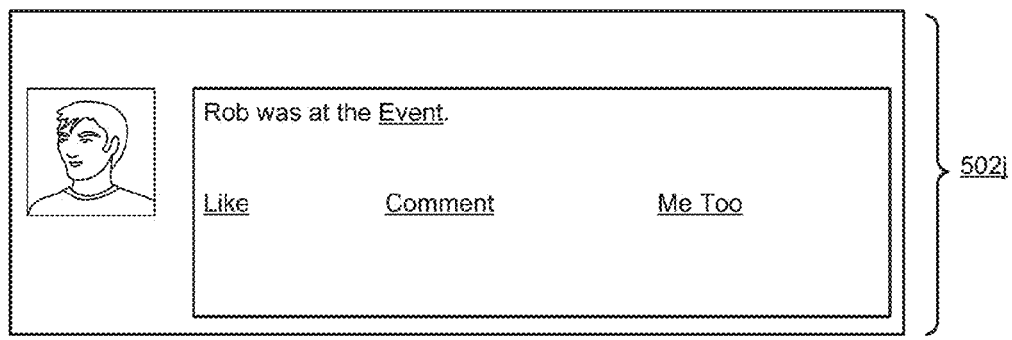
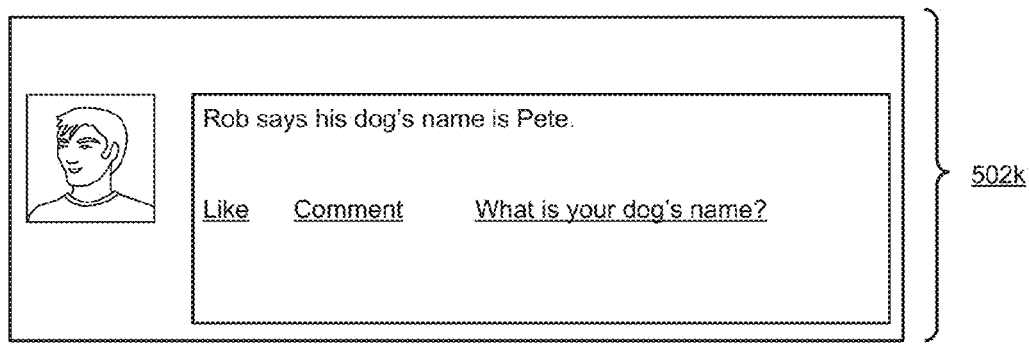
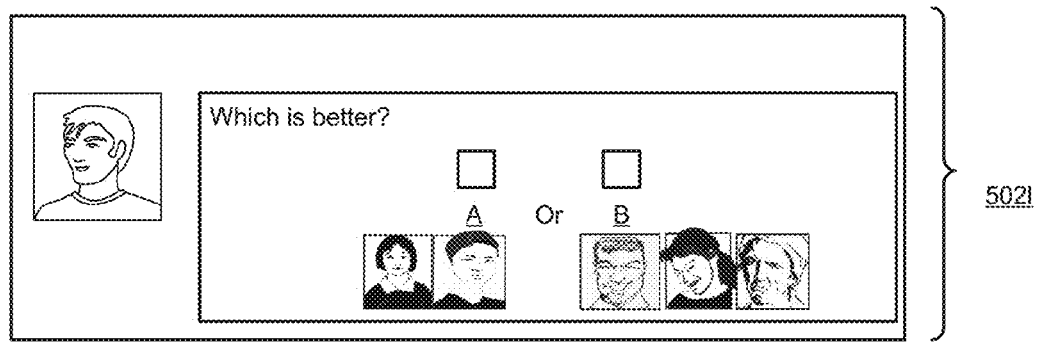
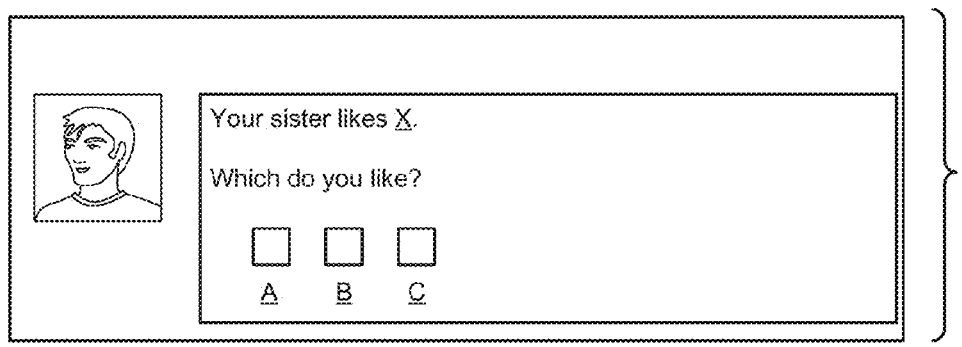
FIG. 5K

PROMPTING SOCIAL NETWORKING SYSTEM USERS TO PROVIDE ADDITIONAL USER PROFILE INFORMATION

CROSS REFERENCE TO RELATED APPLICATIONS

This application is a continuation of co-pending U.S. patent application Ser. No. 13/680,048, filed Nov. 17, 2012, the contents of which is incorporated by reference herein in its entirety.

BACKGROUND

This disclosure relates generally to social networking systems, and in particular to presenting questions to social networking system users to obtain additional user information.

Social networking systems acquire information about users and their relationships to provide a more personalized user experience. Information about a user is often self-reported (e.g., information about the user's interests, activities, and the nature of their relationships with other users). Additional information about a user and user relationships with other users may be collected by the social networking system. Examples of additional information collected include the number, frequency, and directionality of interactions between users and types of interactions between users.

Information about user characteristics, user relationships with other users, and user interests is valuable to users of social networking services and to administrators of the social networking system. Social networking system users, such as advertisers, may use information about other users to target content, such as product advertisements, to specific groups of social networking system users. Social networking system administrators may use user information to better select content for social networking users, providing a more personalized user experience. While a social networking system may request or infer information about its users, most user information is self-reported by social networking system users. This frequently results in incomplete information about the users that is insufficient to improve the user experiences with the social networking system.

SUMMARY

A social networking system presents questions to a user to elicit information about a user that is missing from the user's profile or that is outdated. For example, the social networking system identifies information items in a user profile that are not associated with data ("unknown information items"). Based on a need or value for associating data with an unknown information item, the social networking system selects an unknown information item. The value of associating data with an information item may be based on the revenue or user engagement created by using the data to select content for presentation to the user.

One or more questions associated with the selected unknown information item, or with a type associated with the unknown information item, are selected. The questions may be selected based on the likelihood of a user responding to the question. Various questions associated with the unknown information item may be differently formatted or include different content, and the likelihood of a user responding to the question may vary depending on the format or content of a question. Hence, accounting for the likelihood of a user responding to a question allows selection of a question. Based at least in part on the response probabilities associated with the questions, one or more questions associated with the selected unknown information item are selected. Hence, the selected one or more questions may have formats most likely to obtain a response from the user. Examples of formats for questions include an explicit question, a confirmation and a selection of responses. Additionally, information about other users responding to the question, such as users connected to the user, may be included in the question to further encourage a response.

The selected one or more questions are presented to the user to elicit data for association with the unknown information item from the user. Various communication channels may be used to present the selected one or more questions to a user. For example, a data acquisition interface including a question is presented in a page maintained by the social networking system. Alternatively, one or more questions may be presented as stories in a newsfeed presented to a user, as recommendations for actions to be performed by the user, as messages sent to the user, or using any other suitable communication channel. Received responses to a question are stored in the user profile and associated with the initially selected unknown information item.

BRIEF DESCRIPTION OF THE DRAWINGS

FIG. 1 is a high level block diagram of a process for a social networking system to acquire information items about a user, in accordance with some embodiments.

FIG. 4 is a flow chart of a process for obtaining an information item about a user, in accordance with some embodiments.

FIGS. 5A-5K are examples of a data acquisition interface, in accordance with some embodiments.

Figure 2:
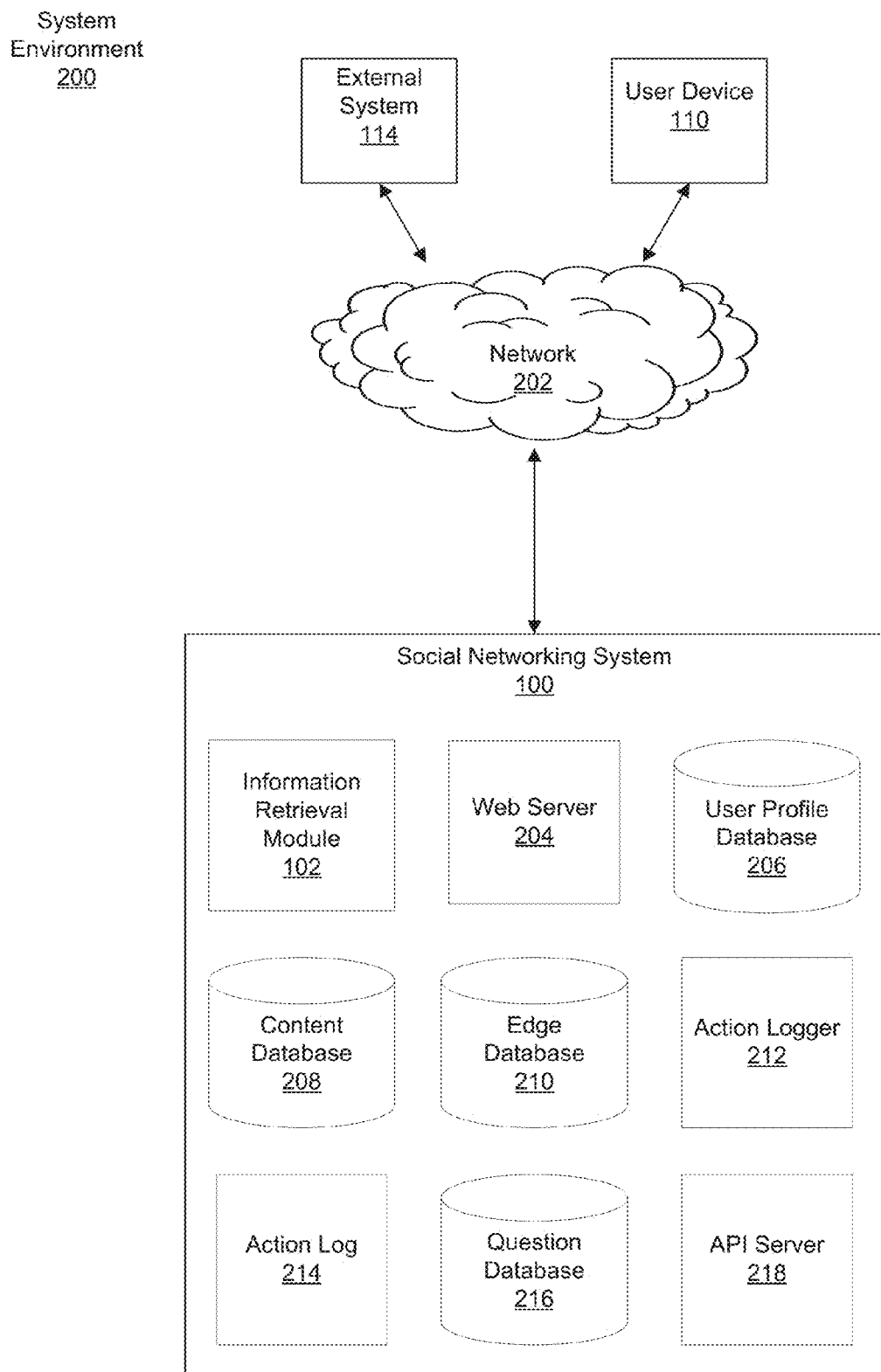
FIG. 2 is a high level block diagram of a system environment, in accordance with some embodiments.

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION

Overview

A social networking system offers its users the ability to communicate and interact with other social networking system users. Users join the social networking system and add connections to other users to which they desire to be connected. Social networking system users may provide descriptive information that is stored in user profiles. For example, a user may provide age, gender, geographical location, education history, employment history and the like for storage in a user profile. The information provided by a user may be used by the social networking system to direct information to the user. For example, the social networking system may recommend social groups, events, and potential connections to other users to a user. A social networking system may also enable users to explicitly express interest in a concept, such as celebrities, hobbies, sports teams, books, music, and the like. These expressions of interests, and other actions captured by the social networking system may be used in a variety of ways. For example, user interests, actions, and/or characteristics may be used to target advertisements or provide personalized content, such as stories about other social networking system users having similar interests, to a user.

Based on information about users, connections between users, and actions performed by users, a social networking system may maintain a social graph. The social graph includes nodes connected by one or more edges. Nodes include users and other objects of the social networking system, such as web pages embodying concepts and entities. Edges connect the nodes and represent interactions between users and/or objects corresponding to the nodes. For example, an edge may represent a user expressing an interest in a news article provided by another user about "America's Cup." The social graph may record interactions between users of the social networking system as well as interactions between users and objects of the social networking system using edges between users and the objects. Additionally, third-party developers or social networking system administrators may define custom graph object types and graph action types having attributes customized to the graph objects or to the graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites.

Third-party developers may enable users of the social networking system to express interest in web pages hosted on websites external to the social networking system. These web pages may be represented as page objects in the social networking system by embedding a widget, a social plug-in, programmable logic, or code snippet into the web pages. For example, an iframe is embedded in a web page to communicate information from the web page to the social networking system. Hence, any concept that may be embodied in a web page may become a node in the social graph on the social networking system. This allows social networking system users to interact with many objects external to the social networking system that are relevant to a keyword or keyword phrase, and the interactions to be stored in as edges the social graph by the social networking system. Enabling third-party developers to define custom object types and custom action types further described U.S. application Ser. No. 13/239,340, filed on Sep. 21, 2011, which is hereby incorporated by reference in its entirety.

While a social networking system may collect and infer, information about its users, certain information about users may be particularly valuable for the social networking system to better understand its users and to provide users with a more personalized experience. Hence, the social networking system may determine information to acquire from a user based on one or more goals of the social networking system and prompt the user to provide the determined information. For example, the social networking system associates values with different items of user information and selects an item of user information based on the values. A question prompting the user for the selected item of user information may then be presented to the user, allowing the user to provide the selected item of user information by answering the question.

FIG. 1 is a high level block diagram of one embodiment of a process for a social networking system to acquire information items about a user. The information retrieval module 102 of the social networking system 100 accesses information associated with a user and determines missing or outdated information items from the information associated with the user. Information items from information associated with the user describe characteristics about the user. To determine which information items to acquire, the information retrieval module 102 analyzes user profile information associated with the user by the social networking system 100 and determines an acquisition value for each missing or outdated information item (also referred to herein as "unknown information items"). User profile information includes information stored as profile objects 104, edge objects 106, and content objects 108.

One or more of the information items associated with a user may be used by the social networking system to achieve various goals. In one embodiment, the information retrieval module identifies missing or outdated information items for optimizing a goal of the social networking system 100 and selects questions for presenting to the user to obtain the identified information items. The social networking system 100 may choose a question presented to the user based on the value to the social networking system of a particular information item to be obtained from a response to the question.

A user device 110 comprises one or more computing devices capable of receiving input from a user as well as transmitting and receiving data via a network. The user device 110 can execute an application 112 allowing a user of the user device 110 to exchange data with the social networking system 100. For example, the user devices 110 execute a browser application or a native application to allow user interaction with the social networking system 100.

The external system 114 includes a webpage 116 with a widget 118 comprising instructions for communicating with the social networking system 100 and/or the user device 110. The widget 118 includes instructions that, when executed, cause a user device 110 to obtain information from the social networking system 100, such as a question for presentation to a user. Additionally, when the instructions comprising the widget 118 are executed, information may be communicated from the user device 100 to the social networking system 100, such as a response to the question presented to the user.

Hence, a social networking system 100 may obtain missing or updated information items about a user. For example, a social networking system 100 may obtain additional information about a user's activities, hobbies, education history, and work history. A social networking system 100 may also prompt the user to confirm changes to a user's personal life inferred by the social networking system 100, such as an engagement, a birth of a child, a move to a different location, a graduation from college, a new job, or any other suitable event. The additionally obtained information allows the social networking system 100 to create a more personalized experience for the user. For example, a social networking system 100 may present statistics about a user's activities, select stories for the user's newsfeed better matching the user's interests and activities, or select advertisements more likely to be relevant to the user.

System Architecture

FIG. 2 is a high level block diagram of one embodiment of a system environment 200. As shown in FIG. 2, the system environment 200 comprises one or more user devices 110, one or more external systems 114, the social networking system 100, and a network 202. In alternative configurations, the system environment 200 includes different and/or additional components. In some embodiments, the social networking system 100 is implemented as a single server, while in other embodiments it is implemented as a distributed system of multiple servers. For purposes of illustration, the embodiment of the system 100 shown by FIG. 2 includes a single external system 114 and a single user device 110. However, in other embodiments, the system environment 200 may include more user devices 110 and/or more external systems 114. In certain embodiments, the social networking system 100 is operated by a social network provider, while the one or more external systems 114 are separate from the social networking system 100 in that they may be operated by different entities. However, in various embodiments, the social networking system 100 and the external systems 114 operate in conjunction to provide social networking services to social networking system users. Hence the social networking system 100 provides a platform, or backbone, which other systems, such as external systems 114, may use to provide social networking services and functionalities to users across the Internet.

The network 202 may be any wired or wireless local area network (LAN) and/or wide area network (WAN), such as an intranet, an extranet, or the Internet. The network 202 provides communication between the user devices 110 and the social networking system 100, and may also provides communication between one or more external system 114 and the social networking system 100 and/or the user devices 110. In some embodiments, network 202 uses the HyperText Transport Protocol (HTTP) and the Transmission Control Protocol/Internet Protocol (TCP/IP) to transmit information between devices or systems. However, various protocols may be used by the network 202 in various embodiments.

The user devices 110 comprise one or more computing devices capable of receiving user input and processing data, as well as transmitting and receiving data via the network 202. In one embodiment, the user device 110 is a conventional computer system, such as a desktop computer, a laptop computer, or other suitable computing device. In another embodiment, the user device 110 is a device having computer functionality, such as a personal digital assistant (PDA), mobile telephone, smart-phone, etc. The user device 110 is configured to communicate via network 202. The user device 110 can execute an application, for example, a browser application, allowing a user of the user device 110 to interact with the social networking system 100. Alternatively, the user device 110 interacts with the social networking system 100 through an application programming interface (API) running on the native operating system of the user device 110, such as IOS® or ANDROID™

The external system 114 is separate from the social networking system 100 and includes one or more web servers providing one or more web pages, which are communicated to the user device 110 using the network 202. For example, the external system 114 is associated with a first domain while the social networking system 100 website is associated with a separate social networking domain. Web pages included in the external system 114 comprise markup language documents identifying content and including instructions specifying formatting or presentation of the identified content. In some embodiments, the web pages include a widget that comprises instructions for obtaining a prompt for information from the social networking system 100 (e.g., for presenting questions to a user using the user device 110) and communicating information obtained in response to the prompt to the social networking system 100 (e.g., sending answers to presented questions to the social networking system 100). For example, if the user accesses a webpage via the external system 114, the widget provides instructions to a browser application on the user device 110 rendering the webpage to request a prompt for information, such as a question/answer interface, for presentation to the user. The request may include an identifier for the user.

In the example of FIG. 2, the social networking system 100 includes a web server 203, a user profile database 206, a content database 208, an edge database 210, an action logger 212, an action log 214, a question database 216, an information retrieval module 102, and an application programming interface (AIP) server 218. However, in different embodiments, the social networking system may 100 may include different and/or additional components.

The web server 204 links the social networking system 100 via the network 202 to one or more user devices 110. The web server 204 serves web pages, as well as other web-related content, such as JAVA®, FLASH®, XML, and so forth. Further, the web server 204 receives and routes messages between the social networking system 100 and the user devices 110. Examples of messages received and routed by the web server 204 include instant messages, queued messages (e.g., email), text and SMS (short message service) messages, or messages sent using any other suitable messaging technique. A user may send a request to the web server 204 to upload information, for example, images or videos that are stored in the content database 208. Additionally, the web server 204 may provide application programming interface (API) functionality to send data directly to native user device operating systems of user devices 110, such as IOS®, ANDROID™, WEBOS®, and BlackBerry OS.

The user profile database 206 stores user profiles 104 associated with each user of the social networking system 100. A user profile 104 includes declarative information about a user, inferred or implicit information about a user from the user's actions on the social networking system 100 and outside of the social networking system 100, information about the user's activities and interests. Examples of information about a user stored in a user profile 104 include biographic, demographic, and other types of descriptive information, such as work experience, educational history, gender, hobbies or preferences, location, and the like. In one embodiment, a user profile 104 includes various data fields for storing information items about a user. Each data field may store a different type of information about a user. Examples of information stored by the data fields include phone numbers, instant message screen names, addresses, websites, current city, hometown, gender, birthday, names of family members, languages spoken, a description, education history, work history, religious affiliations, political views, favorite quotes, favorite sports, favorite foods, favorite books, favorites movies, interests, activities, names of pets, information about friends, and the like.

A user profile 104 of a user may also include the user's affinity scores for objects in the social networking system 100. An affinity score measures or indicates a user's affinity for an object in the social networking system 100. In one embodiment, affinity scores of users for an object may be determined based on the user's interactions with the specified object over time. In particular, affinity scores of a user for an object may be determined based on edges 106 including information describing interactions between the user and object. Example embodiments of computing affinity scores are described in U.S. patent application Ser. No. 12/978,265, filed on Dec. 23, 2010, which is hereby incorporated by reference in its entirety. The user profile database 206 may also store other information provided by the user, for example, images or videos. In certain embodiments, images of users may be tagged with identification information of users of the social networking system 100 displayed in an image. The user profile database 206 also maintains references to the actions stored in an action log 214 and performed on objects in the content database 208, and may include references to the edge database 210 to identify connections between users.

The content database 208 stores content objects 108, which represent content maintained by the social networking system 100. Examples of content objects 108 include a page, content posted to a page, a status update, a photo, a video, a link, a gaming application achievement, a check-in event at a local business, and so on. Content objects 108 include objects created by users of the social networking system 100. Examples of content objects 108 created by a user include status updates, photographs, location information, events, pages, applications installed on the social networking system 100, media content, or other content. In some embodiments, the content objects 108 are received from third-party applications, which may be separate from the social networking system 100.

The action logger 212 receives communications describing user actions on and/or off the social networking system 100. The action logger 212 populates the action log 214 with information about user actions. In one embodiment, one or more privacy settings in a user profile 104 allow a user to limit the information about the user's actions stored in the action log 214. Examples of actions performed by a user include: adding a connection to another user, sending a message to another user, uploading an image, reading a message from another user, viewing content associated with another user, attending an event, or other actions. In addition, a number of actions described in connection with other objects are directed at particular users, so these actions are associated with those users as well.

The action log 214 may track users' actions on the social networking system 100 as well as on external websites that communicate information back to the social networking system 100. As mentioned above, users interact with various objects on the social networking system 100. Examples of interactions with objects include commenting on posts, sharing links, and checking-in to physical locations via a mobile device. The action log 214 may also include information describing user actions on external websites. For example, an e-commerce website that primarily sells luxury shoes at bargain prices may recognize a user of a social networking system 100 through social plug-ins enabling the e-commerce website to identify the social networking system user. Because social networking system users are uniquely identifiable, external systems 114, such as this luxury shoe reseller, may use the information about these users as they visit their websites. The action log 214 records data about these users, including viewing histories, advertisements that were clicked on, purchasing activity, and buying patterns.

The edge database 210 stores edges 106, which describe connections between users and other users or between users and content objects in the social networking system 100. Edges 106 connect objects in the social graph and include information about interactions with objects and/or users associated with the edges. For example, an edge 106 may describe a user accessing a link, a user sharing photos with other users of the social networking system 100, a user posting a status update message on the social networking system 100, or other actions performed internal and external to the social networking system 100.

Some edges 106 may be defined by users, allowing users to specify their relationships with other users or content objects 108. For example, users may generate edges with other users that parallel the users' real-life relationships, such as friends, co-workers, partners, and so forth. Other edges 106 are generated when users interact with content objects 108 in the social networking system 100. Examples of interactions with content objects 108 include expressing interest in a page on the social networking system 100 ("liking" the page), sharing a link with other users of the social networking system 100, and commenting on posts made by other users of the social networking system 100. The edge database 210 includes information about edges 106 such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored as one edge 106 in the edge database 210 or may be stored as multiple edges 106. For example, a user playing songs from Norah Jones' album, "Little Broken Hearts," may be associated with multiple edges 106 for each of the songs and associated with an edge 106 for Norah Jones. Edges 106 may include information about user interactions outside of the social networking system 100. For example, interaction information may be collected from third-party systems (e.g., sites and applications) using social plug-ins allowing interaction with social networking system content.

The question database 216 stores prompts for presentation to a social networking system user to obtain various information items about the user. For example, a prompt presents a question to a user to elicit a response that provides the social networking system 100 with a particular information item about the user. In one embodiment, prompts are questions stored in the question database 216 using one or more templates including phrases, words, characters, images, symbols, or other information structured to elicit a particular information item or a particular type of information item about a user when presented. For example, a question may be presented as a sentence phrased as a question, an incomplete statement, a selection of multiple choice answers, or any other suitable format for eliciting a response from a user. In one embodiment, the question database 216 stores associations between prompts and an information item or a type of information item, allowing retrieval of questions based on a type of information item.

The application programming interface (API) server 218 allows one or more user devices 110 to access information from or send information to the social networking system 100 using one or more APIs. In one embodiment, a user device 110 sends an API request to the social networking system 100 via the network 202 and the API server 218 processes the received API request using an API associated with the API request. A response to the API request is communicated to the user device 110 by the API server 218 via the network 202. For example, responsive to an API request, the API server 218 collects data associated with a user, such as users connected to the user, and communicates the collected data to the user device 110. In another embodiment, an external system 114 hosting web pages communicates with the social networking system 100 via APIs. In some embodiments, the API server 218 includes functions allowing a third party application to provide user data for incorporation into questions, or other prompts, presented to a user to elicit information about an unknown information item about a user.

Determining which User Information to Acquire

Figure 3:
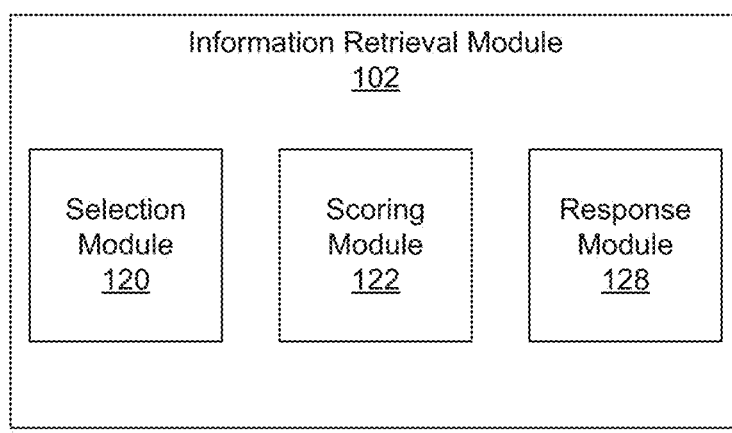
FIG. 3 is a high level block diagram of an information retrieval module for acquiring information about a user of a social networking system, in accordance with some embodiments.

FIG. 3 is block diagram of one embodiment of the information retrieval module 102, which identifies unknown information about a user and identifies a prompt from the question database 216 to obtain the unknown information item. Hence, the information retrieval module 102 determines what information to request from a user and a format for requesting the information from the user. In the embodiment shown by FIG. 3, the information retrieval module 102 includes a scoring module 120, a question selection module 122, and a response module 124.

Types of Information Items

As described above, a user profile 104 includes declarative information provided to the social networking system 100 by the user and may also include information about the user inferred about the user by the social networking system 100. For example, the social networking system 100 may infer a user's interests in a music artist based on the user's activities internal to and external to the social networking system 100, such as playing songs by the artist or discussing the artist. A user profile 104 may also include information about the user's activities on the social networking system 100 and/or on external systems 114. For example, information describing actions of the user on a third party website may be sent to the social networking system 100 and stored in the edge database 210 or in the action log 214. The user profile 104 may retrieve the information describing the actions. Additionally, a user profile 104 may identify a user's connections to other users from the edge store 214.

Hence, a user profile 104 includes multiple information items, each providing different information about a user. For example, different declarative information in a user profile 104 comprises different information items. Connections to other users and descriptions of actions may be other information items associated with a user profile 104. A type may be associated with an information item to describe the information item. Examples of types may include actions, connections, interests, demographic information, or other suitable descriptions. In some embodiments, a timestamp is associated with an information item indicating when the information item was obtained or created. In some embodiments, an information item is associated with a geographic location identifying where the information was acquired or locations of one or more users associated with the information item.

Determining Value of Acquiring an Information Item

The social networking system 100 associates a value with various information items in the user profile 104. The values of information items are used by the scoring module 120 to identify an unknown information item to request from a user. In one embodiment, the value associated with an information item indicates the value to the social networking system 100 of obtaining the information item. The scoring module 122 determines a value for the information items in a user profile 104 and uses the values to select one or more information items for which data is not stored ("unknown information items"). In one embodiment, a value of an information item measures the social networking system's 100 need for a type of information associated with the information item; the need may be based in part on the ability of the social networking system 100 to use the type of information for providing content to a user. The scoring module 122 identifies user profile information for a user to identify unknown information items and selects an unknown information item based on the values associated with the unknown information item; the scoring module 122 may select the unknown information item having the highest value. For example, if a user profile 104 does not include information identifying a user's "current city," the scoring module 122 may associate a relatively large value for the "current city" information item, as it may be used for selecting advertisements or other content for presentation to the user. Hence, the scoring module 122 selects the information item "current city" to obtain from the user.

In some embodiments, in addition to identifying information items in a user profile 104 not associated with data, the scoring module 122 identifies information items associated with data that has not been updated for a threshold amount of time or that was not obtained within a threshold amount of time from a current time. One or more information items may be associated with a time limit specifying a length of time for updating the data associated with the information item. Different types of information items may be associated with different time limits. For example, a an information item including a user's hobbies may have a shorter time limit than an information item including the user's hometown as the user is more likely to change hobbies than hometown. In some embodiments, the social networking system 100 assigns a recency score to an information item that may decay over time by a decay rate; the decay rate for an information item may depend on the type of information item.

Data Acquisition Value of an Information Item

The scoring module 122 determines a data acquisition value for each information item associated with a user's profile. A data acquisition value measures a need of the social networking system 100 for the type of information associated with an information item. For example, the data acquisition value represents the ability of the social networking system 100 to select content for a user based on the type of information; as another example, the data acquisition value may be based on an amount of user profile information for the user, and may be determined based on a difference between a threshold amount of information and a stored amount of user profile information. In some embodiments, the data acquisition value for an information item is determined based on the value of the information to the social networking system 100 and the probability of getting a response from the user. For example, the data acquisition value for an information item may be the product of the value of the information and the probability of getting a response from the user to a question or prompt.

In some embodiments, the scoring module 120 stores value entries identifying an information item, and a data acquisition value for the information item. Alternatively, a value entry identifies an information item, the value of the information item, and a response probability of a question or prompt associated with a type of information item. Various value entries including response probabilities for different formats of a prompt or question. For example, a value entry associated with a prompt for identifying an information item whether the user owns a dog identifies the type of information item, the question or the question format, a value of 2 and a response probability of 50%; may be [2, 50%]; a value entry for a question asking for an information item identifying a dog's name after presentation of the prompt of whether the user owns a dog includes a value of 50 and a response probability of 90%.

Probability of Acquiring an Information Item

In some embodiments, the data acquisition value for an information item is based in part on the probability of the user responding to a prompt to provide data associated with the information item. The scoring module 122 may store a table associating response probabilities for each information item or may store single response probability associated with a user. In one embodiment, the scoring module 122 uses a user's affinity for one or more attributes of a question or prompt to determine the probability of the user responding to the question or prompt. Examples of attributes of a question used to calculate a response probability include: subject matter of the question, entity presenting the question, format in which the question is presented, and a time when the question is presented. In some embodiments, a response probability of a user for an information item is based on the user's historical response rate to questions or prompts. The historical response rate may be a general response rate or specific to questions related to specific types of information items, specific to a format in which questions were presented, or times when questions were presented. For example, a user may be more likely to provide information to questions about interests than to questions about work history. In another example, a user may be more likely to respond to a prompt from another user connected to the user than to a prompt presented by the social networking system 100.

A user's response probability for a question associated with an information item or with a type of information item may be based at least in part on historical response rates to prompts, or questions, by additional users connected to the user. In some embodiments, a user's response probability for a question or prompt associated with an information item is based at least in part on a question previously-presented to the user, a response from the user to the previously-presented question, or a combination of thereof. For example, the probability of a user responding to a question to obtain name of the user's dog may be higher if the user is first presented with a question to obtain information about whether the user owns a dog. The format in which a prompt or question is presented may affect a user's response probability to a question. For example, a user may be more likely to respond by completing a series of phrases rather than responding to a sentence; as an example a user may have a higher response probability to the phrase my "My favorite actor is" after completing the phrase "My favorite movie is."

One or more machine learning processes may be used to determine response probabilities. A machine learning process observes patterns in data to predict user behavior (e.g., whether a user will respond to a question based on features of the question) and adjusts its behavior in order to improve its performance. Initially, a machine learning process infers a function from training data and uses the inferred function to predict an output for an input object. The training data includes a set of input objects, such as questions or prompts previously presented to a user, and corresponding outputs. The input objects are labeled with features indicating whether the user responded to the question or prompt. Examples of features indicating whether the user responded to the question include attributes of a presented question, such as question type, question subject matter, entity that presented the question, format in which the question was presented, and time when the question was presented. Additional examples of features include attributes of the user to which the question was presented, such as biographic information, geographic information, social information, or other user profile information. Features may be extracted from stored user profile information, received a third-party or developer, or by a combination thereof. The outputs corresponding to input objects in the training data indicate whether the user responded to a question or prompt. In one example, an output is a binary value indicating whether or not a question received a response from a user. As another example, the output indicates a degree of similarity between responses received based on presentation of different questions or prompts.

Selecting a Question to Acquire an Information Item

The selection module 120 determines a prompt or question, a format for the prompt or question, and a time to present the prompt or question to a user to obtain data associated with an information item, such as an unknown information item. To select a question or prompt for presentation to a user, the selection module 120 retrieves one or more value entries for an information item, selects one or more questions based on the value entries, and presents the selected one or more questions to a user.

In some embodiments, the scoring module 122 sends the selection module 120 a specified number of value entries having the highest data acquisition values or having data acquisition values equaling or exceeding a threshold value. The selection module 120 selects one or more questions from the question database 216 based on the received value entries for the questions. In one embodiment, the selection module 120 identifies a value entry having the highest response probability and selects one or more questions from the question database 216 associated with a type matching the type of information item included in the selected value entry. For example, the selection module 120 selects one or more questions having the highest response probabilities for obtaining information about the user's favorite band when the information item associated with a favorite band has the highest data acquisition value. As discussed above, questions stored in the question database 216 are associated with information items or types of information items.

The selection module 120 may present the selected questions in any suitable manner. For example, a question is presented via a data acquisition interface of a social networking system page, via an application external to the social networking system 100, via a push notification, or via any suitable communication channel. In one example, the one or more questions are presented to a user as a story in a user's newsfeed. Questions or prompts may be presented in response to a user performing one or more actions, such as commenting on a story, sharing a story, dismissing a story, or expressing a preference of a story. For example, the selection module 120 may present a question or prompt to a user to obtain an unknown information item related to a story for which the user expresses a preference. In another example, the selection module 120 may adds a link to a story in a newsfeed to obtain an information item from a user by requesting confirmation of an information item associated with another user. For example, the selection module 120 includes a "Me too" link in a newsfeed story associated with a user, allowing a user viewing the story to access the link to include content associated with the story in the user profile of the user viewing the story (e.g., the link allows a user to store an information item indicating the user attended an event identified by the story).

In some embodiments, the selection module 120 presents a selected question or prompt using an interface (e.g., a data acquisition interface) presented when the user views a page from the social networking system 100, views a page from an external system 114, or uses an application external to the social networking system 100. Alternatively, a selected question or prompt is presented using a push notification channel, a message transmitted to a user, or is presented using any suitable communication channel. A selected question or prompt may be presented along with various types of content, such as advertisements, applications, photographs, videos, status messages, events, pages, recommendations to perform actions, or any other content provided by or accessible via the social networking system 100. Hence, questions or prompts may be presented to a user using a variety of communication channels. Examples of communication channels include a newsfeed, a posting on a page, an email, a comment on a content item, a mobile application, a third-party application, a text message, an iframe, a social plug-in, a notification, an advertising communication channel, a recommendation to perform an action, a discussion board, or any other communication channel associated with the social networking system 100. Communication channels are discussed further in U.S. patent application Ser. No. 12/253,149, filed on Oct. 16, 2008, which is hereby incorporated by reference in its entirety.

In some embodiments, the selection module 120 presents a selected question or prompt in response to a user performing an action internal to or external to the social networking system 100. Examples of actions that may cause presentation of a prompt or question to a user include: checking-in to a restaurant, posting a status message updated, sending a message to another user, playing a song, viewing video, playing a game, viewing a profile, using an application, or performing any other suitable action. For example, when the user checks into a restaurant, the selection module 120 may present the user with question about the food at the restaurant typically ordered by the user.

A question or prompt presented by the selection module 120 may be formatted in a variety of ways. The formatting of a prompt may be determined based at least in part on the value to the social networking system 100 of obtaining data for the information item associated with the prompt. In some embodiments, the selection module 120 presents an explicit question associated with an information item when the user views a page via the social networking system 100. For example, the explicit question "What is your favorite band?" is presented to obtain data for an information item identifying a user's favorite band. As another example, a prompt may be presented along with potential answers, allowing a user to select an answer from the potential answers. Prompts presented to a user may include information associated with the user or with other users connected to the user. For example, the selection module 120 may present a user with question associated with an information item that includes information about users connected to the user, such as "Your friend likes X. Do you?" or "Jim's dog's name is Spike. What's your dog's name?"

In one embodiment, the selection module 120 presents a question to a user to obtain an information item for an additional user, such as a user connected to the user. For example, a prompt presented to a user allows the user to ask another user connected to the user for information. For example, Bob and Alice are users connected to each other, so the selection module 120 presents Bob with a prompt indicating: "Click here to ask Alice for her favorite band." Accessing the prompt causes the selection module 120 to present a question to Alice to identify a favorite band; the question may identify Bob to increase the likelihood that Alice provides an answer to the question. As another example, a question presented to a user includes a link or other interface element to communicate the question to other users connected to the user. If a user communicates a question to other users, the selection module 120 may identify the user communicating the question to the other users.

In some embodiments, the selection module 120 formats a prompt as a comparison between or a selection among a set of responses. The prompt may include information identifying responses selected by other users connected to the user viewing the prompt. For example, a question "Which is better? A or B?" may be presented to a user along with an indication of users, or a number of users, connected to the user that selected A and that selected B. The prompt may identify users selecting a particular response. Alternatively, after a user selects a response, the selection module 120 modifies the prompt to identify other users connected to the user or to identify a number of users connected to the user selecting the same response as the user.

The selection module 120 may select the set of responses based on one or more factors, including similarity of responses, probability the user selects a response, and affinity of the user for a response. In one embodiment, the selection module 120 selects responses for which the user has at least a threshold probability of selection or for which the user has at least a threshold affinity. The threshold probability of selection or the threshold affinity may be specified or may be dynamically calculated and adjusted based on response information. In one embodiment, the selection module 120 may include one or more responses having a probability of selection or affinity below a threshold and one or more responses having a probability of selection or an affinity above the threshold in the set of responses. Alternatively, the set of responses includes responses having probabilities of selection or affinities all below a threshold or all above the threshold.

The response module 124 receives and stores responses to a prompt or question received from a user. When a user provides information in response to a presented prompt or question, the response module 124 identifies the user profile associated with the user from the user profile database 205 and identifies the information item associated with the presented prompt or question. The response module 124 associates the received information with the information item and stores the received information in the user profile. In some embodiments, the response module 124 receives data from a third party application in response to a question or prompt presented to a user by the third party application to the user.

Obtaining Information about a Social Networking System User

FIG. 4 is a flow chart of one embodiment of a process 400 for obtaining an information item about a user. The process 400 is performed at a server system (e.g., the social networking system 100) having one or more processors and non-transitory memory. The non-transitory memory stores one or more instructions that, when executed by one or more processors, perform the actions described below.

The social networking system 100 maintains 402 a user profile for a user. The user profile may be stored in a user profile database 205, further described above in conjunction with FIG. 1. The user profile includes data associated with various information items, as described above. One or more information items in the user profile may not be associated with data or may be associated with data was obtained more than a threshold time from a current time ("unknown information items"). The social networking system 100 may identify the unknown information items in the user profile.

As described above in conjunction with FIG. 3, the social networking system 100 determines 404 an acquisition value associated with various information items in the user profile. The acquisition value of an information item is based on the value to the social networking system 100 of storing data associated with the information item. In some embodiments, the value of the information to the social networking system 100 is determined based on projected revenue from using the information item. The social networking system 100 may generate revenue from the information item by using the information item in a sponsored story or using the information item to determine which advertisements to display to the user, and the expected revenue from advertisements or sponsored stories may influence the value of an information item. Data associated with an information item may be used to create personalized content for the user or to select content in which a user likely to have an interest. Thus, in some embodiments, the value of an information item is determined based on a projected increase in user engagement with the social networking system 100 by using data associated with the information item to select content. The cost of the displaced content may be taken into account with the value of the information item. When the displaced content is an advertisement, the cost may correspond to the revenue lost from not displaying the advertisement. When the displaced content is social content, the cost of the displaced content may corresponds to projected loss in user engagement.

The data acquisition value for an information item may be determined 404 is based on the value of data associated with the information item to the social networking system 100 and the probability of the user responding to a question or prompt associated with the information item or with a type associated with the information item (a "response probability"). The response probability may be determined based on a user's affinity for one or more attributes of a question, including subject matter of the question, entity or user associated with the question, formatting of the question, and time when the question is presented. In other embodiments, the response probability may be based on a user's historical responses to questions, responses to questions by other users connected to the user, a question previously-presented to the user, a response from the user to a previously-presented question, or a combination of thereof. In one embodiment, the social networking system 100 determines 404 a data acquisition value for unknown information items in the user profile; alternatively, the social networking system 100 determines a data acquisition value for each information item in the user profile.

Based on the data acquisition values associated with information items, an unknown information item is selected 406. In some embodiments, a set of candidate unknown information items are selected from the user profile, and an unknown information item is selected 406 from the candidate unknown information item based on the data acquisition values. For example, the unknown information item associated with the largest data acquisition value.

A question associated with the selected unknown information item or associated with a type associated with the unknown information item is selected 406. In one embodiment, value entries from the scoring module 120 associated with the unknown information item, or with a type associated with the unknown information item, and with one or more questions are retrieved. A value entry identifies a question associated with an information item, with a type of information item and a response probability. Different questions associated with the information item may have different response probabilities because of different formats for the questions or different content for the question. Value entries having the highest response probabilities may be retrieved or value entries having response probabilities equaling or exceeding a threshold are retrieved. Based on the response probabilities, one or more questions or prompts are selected 408. For example, the social networking system 100 selects 406 the value entry having a maximum response probability. In another example, questions or prompts having at least a threshold response probability are selected 408.

The social networking system 100 presents 410 one or more selected questions or prompts to a user. For example, the selected questions or prompts are presented 410 in a data acquisition interface, as described above in conjunction with FIG. 3. However the questions or prompts may be presented 410 using any suitable communication channel. Examples of communication channels include a newsfeed, a posting on a page, an email, a comment on a content item, a mobile application, a third-party application, a text message, an iframe, a social plug-in, a notification, an advertising communication channel, a discussion board, or any other communication channel associated with the social networking system 100. Data received from users responding to the presented 410 questions or prompts is associated with the selected unknown information item and stored in the user profile.

Data Acquisition Interface Example

Figure 5A:
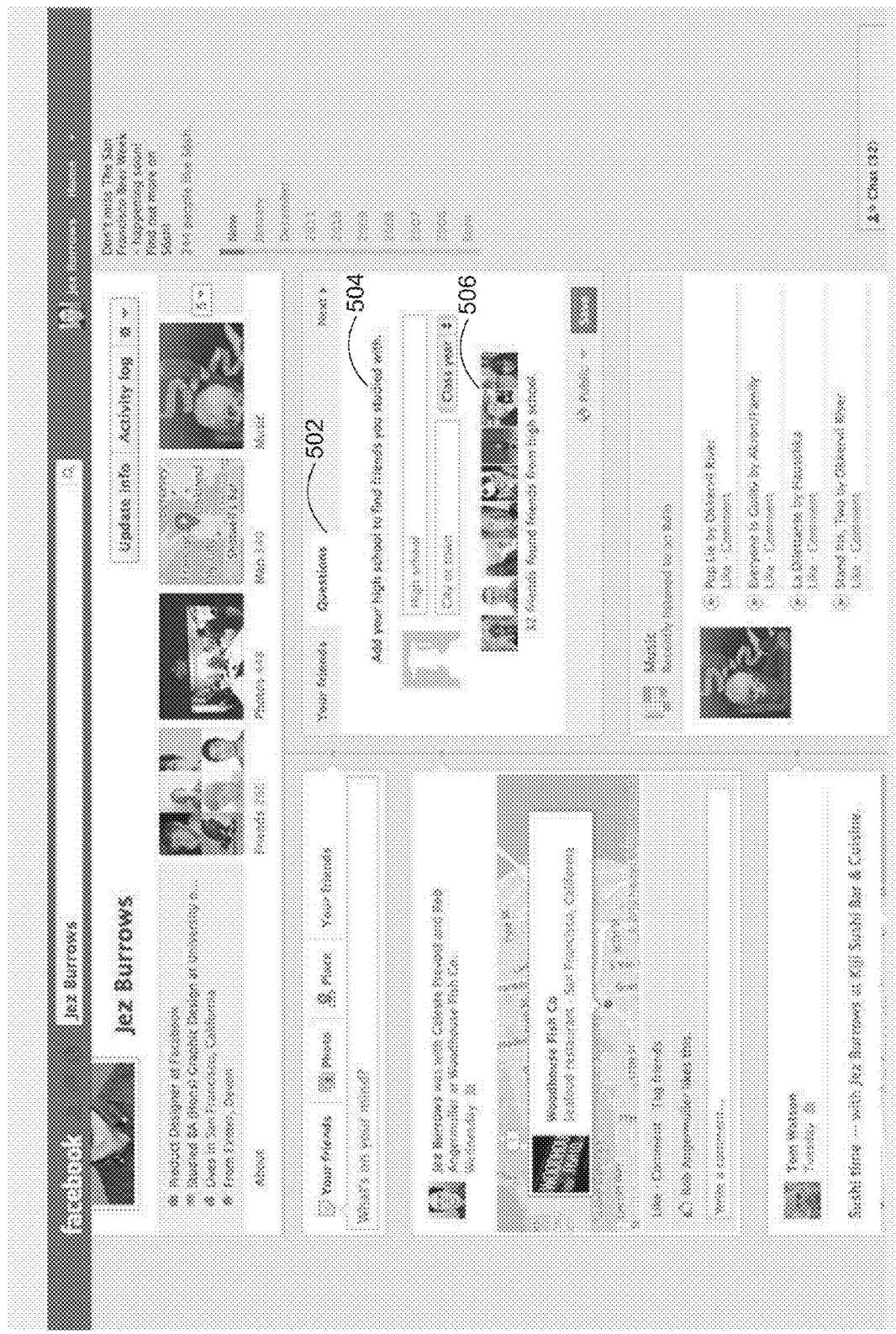
Figure 5B:
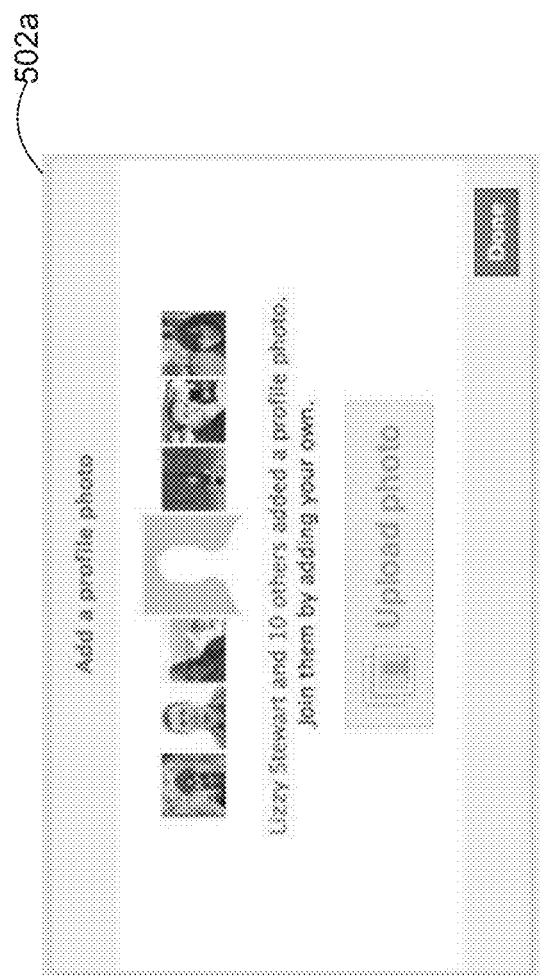
Figure 5C:
Figure 5D:
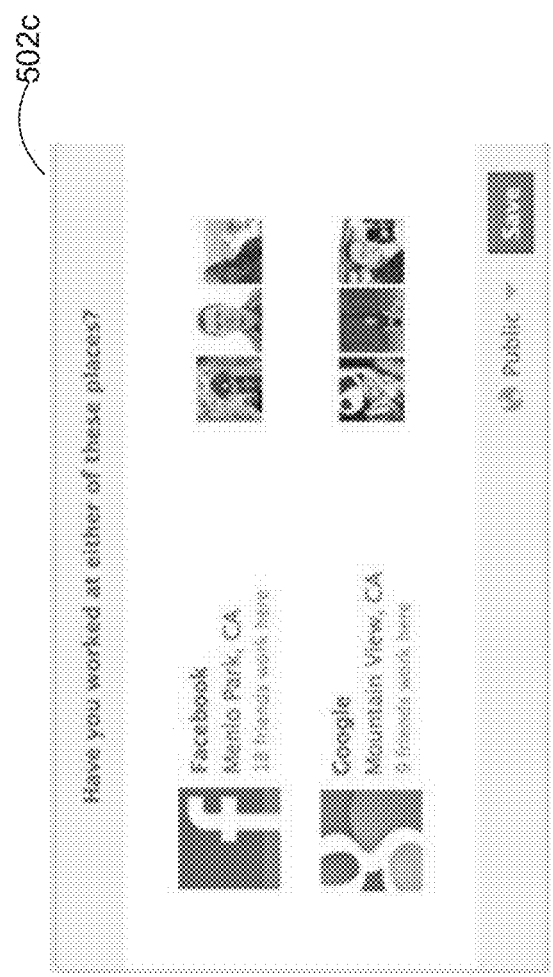
Figure 5E:
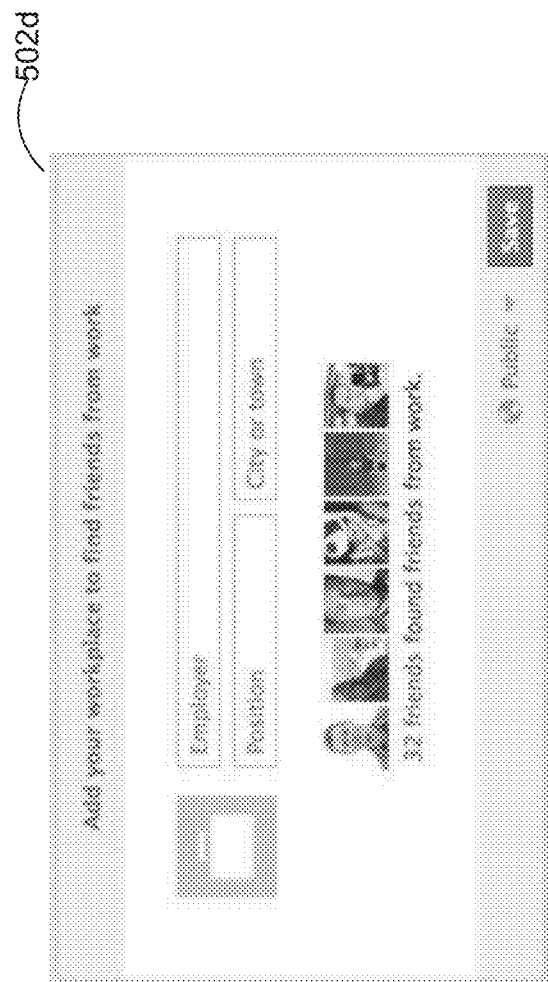
Figure 5F:
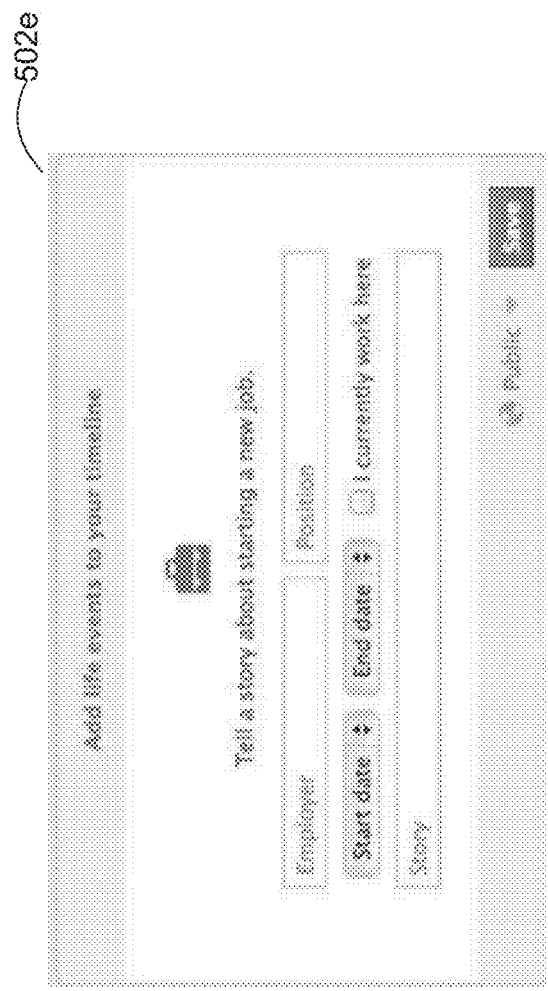
Figure 5G:
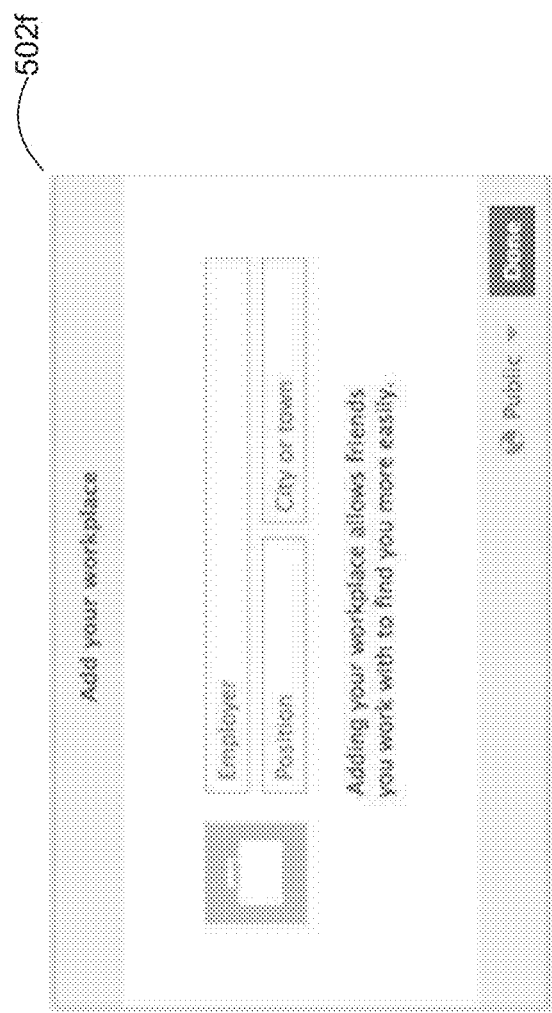
Figure 5H:
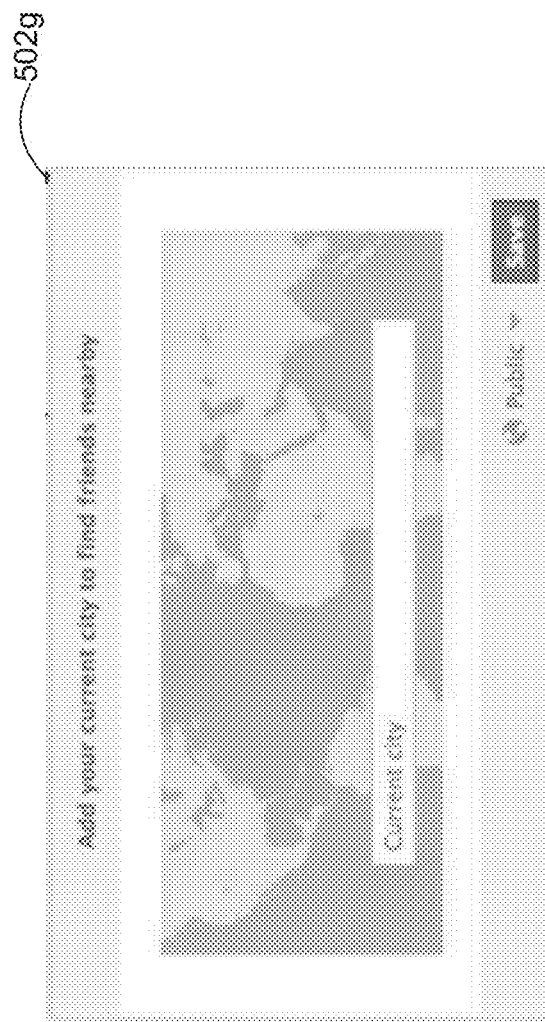
Figure 5I:
Figure 5J:
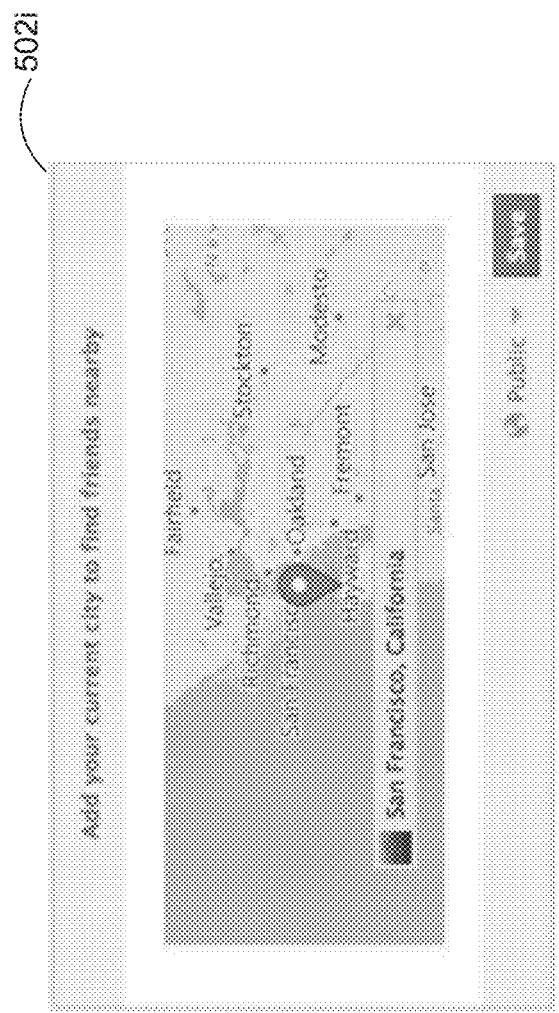

FIGS. 5A-5K illustrate examples of a data acquisition interface, in accordance with some embodiments. In the example of FIG. 5A, the data acquisition interface 502 includes a question 504 associated with an information item, "high school," and input fields associated with the name and city of the high school for responding to the question. The acquisition interface 502 also includes an indication 506 of other users that have found friends from high school to encourage response to the question. FIGS. 5B and 5K provide examples of various data acquisition interfaces 502a-m including differently formatted questions associated with various information items, as further described above in conjunction with FIG. 3.

Summary

The foregoing description of the embodiments of the invention has been presented for the purpose of illustration; it is not intended to be exhaustive or to limit the systems and methods to the precise forms disclosed. Persons skilled in the relevant art can appreciate that many modifications and variations are possible in light of the above disclosure.

Some portions of this description describe the embodiments of the systems and methods in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the systems and methods may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the systems and methods may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the systems and methods be limited not by this detailed description, but rather by any claims that issue on an application based hereon. Accordingly, the disclosure of the embodiments of the systems and methods are intended to be illustrative, but not limiting, of the scope of the invention, which is set forth in the following claims.

What is claimed is:

1. A method comprising: maintaining a profile for the user at a social networking system including a processor, the profile including one or more information items associated with data describing characteristics of the user and a set of unknown information items not associated with data; obtaining a plurality of questions associated with one or more unknown information items from the set of unknown information items at the social networking system; determining, for each of the plurality of questions associated with the one or more unknown information items, a response probability based at least in part on one or a combination of a format and content of the question, the response probability indicating a likelihood of the social networking system receiving a response to the question when presented; determining a data acquisition value for each of the one or more unknown information items in the set of unknown information items, the data acquisition value of an unknown information item based at least in part on a value to the social networking system of associating data with the unknown information item and the determined response probability; selecting an unknown information item from the one or more unknown information items by the social networking system based at least in part on the data acquisition values; and selecting, by the social networking system, a question associated with the selected unknown information item for presentation to the user based at least in part on the response probabilities of one or more questions associated with the selected unknown information item.

2. The method of claim 1, wherein the format of the question comprises a series of phrases.

3. The method of claim 1, wherein the format of the question comprises a selection of responses.

4. The method of claim 1, wherein the format of the question comprises a request for confirmation.

5. The method of claim 1, wherein the format of the question comprises a selection of multiple choice answers of responses.

6. The method of claim 1, wherein the response probability is based at least in part on a historical response rate of the user to requests for information presented by the social networking system.

7. The method of claim 1, wherein the response probability is based at least in part on a historical response rate to requests for information by additional users connected to the user.

8. The method of claim 1, further comprising: retrieving, at the social networking system, features associated with users of the social networking system from which the social networking system received data associated with the unknown information item after requesting; determining, at the social networking system, features of the users of the social networking system from which the social networking system received data associated with the unknown information item after requesting; determining features of the user by the social networking system; and determining the probability of receiving data associated with the unknown information item by the social networking system based on a comparison of the features of the user and the features of the users of the social networking system from which the social networking system received data associated with the unknown information item after requesting receiving.

9. The method of claim 1, wherein the value to the social networking system of associating data with the unknown information item is based at least in part on projected revenue generated from selecting content using the data associated with the unknown information item.

10. The method of claim 1, wherein the value to the social networking system of associating data with the unknown information item is based at least in part on user engagement with the social networking system based on content selected using the data associated with the unknown information item.

11. The method of claim 1, further comprising: receiving a response to the selected question from the user; and selecting an additional question based at least in part on the received response.

12. The method of claim 1, further comprising: receiving a response to the selected question from the user; and associating the response with the unknown information item in the user profile.

13. The method of claim 1, wherein obtaining a plurality of questions associated with one or more information items comprises retrieving a stored question.

14. The method of claim 1, wherein obtaining a plurality of questions associated with one or more information items comprises generating a question.

15. A method comprising: presenting a plurality of prompts requesting information items associated with data describing characteristics of a user of a social networking system including a processor; logging, in a database maintained by the social networking system, a plurality of responses from the user to the plurality of prompts; maintaining a profile for the user in a user profile database maintained by the social networking system, the profile including one or more information items associated with data describing characteristics of the user and a set of unknown information items not associated with data; obtaining a plurality of prompts associated with one or more information items from the set of unknown information items; determining, for each of the plurality of prompts associated with the one or more information items from the set of unknown information items, a response probability based at least in part on one or a combination of a format and content of the prompt, the response probability indicating a likelihood of the social networking system receiving a response to a prompt when presented; determining a data acquisition value for each of a plurality of the unknown information items in the set of unknown information items, the data acquisition value of an unknown information item based at least in part on a value to the social networking system of associating data with the unknown information item and the determined response probability; selecting an unknown information item from the set of unknown information items by the social networking system based at least in part on the data acquisition values; and selecting, by the social networking system, a prompt associated with the selected unknown information item for presentation to the user based at least in part on the response probabilities of one or more prompts associated with the selected unknown information item.

16. The method of claim 15, wherein the format of the prompt comprises a format selected from a group consisting of series of phrases, a selection of responses, a request for confirmation, and a selection of multiple choice answers of responses.

17. The method of claim 15, wherein the response probability is based at least in part on a historical response rate of the user to requests for information presented by the social networking system.

18. The method of claim 15, wherein the response probability is based at least in part on a historical response rate to requests for information by additional users connected to the user.

19. The method of claim 15, wherein the response probability is based at least in part on a response to a previously presented prompt received from the user.

20. The method of claim 15, wherein selecting the unknown information item from the set of unknown information items based at least in part on the data acquisition values comprises: selecting an unknown information having a highest data acquisition value.

21. The method of claim 15, wherein the value to the social networking system of associating data with the unknown information item is based at least in part on projected revenue generated from selecting content using the data associated with the unknown information item.

22. The method of claim 15, wherein the value to the social networking system of associating data with the unknown information item is based at least in part on user engagement with the social networking system based on content selected using the data associated with the unknown information item.

23. The method of claim 15, further comprising: receiving a response to the selected prompt from the user; and selecting an additional question based at least in part on the received response.

24. The method of claim 15, wherein obtaining a plurality of prompts associated with one or more information items comprises retrieving a stored question.

25. The method of claim 15, wherein obtaining a plurality of prompts associated with one or more information items comprises generating a question.

* * * * *

UNITED STATES PATENT AND TRADEMARK OFFICE
CERTIFICATE OF CORRECTION

PATENT NO. : 9,491,207 B2
APPLICATION NO. : 14/837639
DATED : November 8, 2016
INVENTOR(S) : Samuel Lessin et al.

Page 1 of 1

It is certified that error appears in the above-identified patent and that said Letters Patent is hereby corrected as shown below:

In the abstract (57), Line 9, after "in", delete "a".

Signed and Sealed this
Fourth Day of April, 2017

Michelle K. Lee
*Director of the United States Patent and Trademark Office*